Dec. 4, 1934.   E. L. HALL   1,983,228
BOLTED PIPE JOINT

Filed July 24, 1933

Inventor
Edwin L. Hall,
By Augustus B. Stoughton.
Attorney

Patented Dec. 4, 1934

1,983,228

UNITED STATES PATENT OFFICE 1,983,228

BOLTED PIPE JOINT

Edwin L. Hall, Philadelphia, Pa., assignor to The United Gas Improvement Company, Philadelphia, Pa., a corporation of Pennsylvania Application July 24, 1933, Serial No. 681,940

4 Claims. (Cl. 285—17)

The present invention relates to bolted joints for underground piping.

I have found by tests that when typical bolted metal pipe joints have been exposed to electrolytic corrosion, the bolts and nuts usually suffer a greater proportionate loss of metal than the remainder of the joint. Due to their position and surface exposure, a disproportionate part of the current leaving the joint tends to leave from the bolts and nuts. This effect tends to cause failure of the joints by corrosion of bolts and nuts, while the remainder of the joint is in relatively good condition.

The principal object of the present invention is to provide means for protecting the bolts and nuts from such disproportionate corrosion, thereby lengthening the useful life of the joint.

The invention will be described in connection with the attached figures, which form a part of this specification and which show forms of the invention chosen for illustration and in which—

Figure 1:
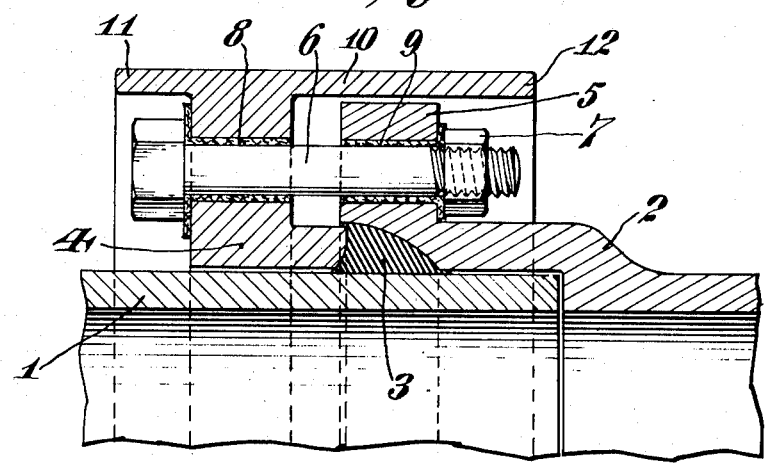
Fig. 1 shows chiefly in cross section a portion of a bolted metal bell and spigot pipe joint, provided with through bolts and nuts.

Referring to Fig. 1, 1 generally indicates the spigot end of a pipe section which is inserted in the bell end 2 of an adjacent section. 3 indicates a rubber gasket, driven into the joint by the follower ring 4, which is bolted to the flange 5 of the bell by bolts such as bolt 6, passing through bolt holes in the follower ring and flange and drawn up and secured by the nut 7. 8 and 9 are thimbles of electrically insulating material such as fibre arranged to insulate the bolt and nut from the follower ring and flange.

10 is an extension of the follower ring formed to project beyond the head of the bolt at 11 and beyond the nut and threaded end of the bolt at 12, providing a protecting sleeve of metal arranged radially outward from all portions of the bolt and nut. Current leaving the joint tends to leave from the extension of the follower ring rather than from the bolt and nut, and the rate of loss of metal from the bolt and nut is diminished and the life of the joint prolonged.

The provision of the insulating thimbles aids in protecting the bolt and nut as it reduces the current which may be transmitted to the bolt and nut from the pipe sections. The extension 11 may form a sleeve encircling the entire joint or may be arranged at intervals over each bolt.

If desired as further protection, the space between the ends of the extension and the spigot and bell may be filled with plastic electrically insulating material such as pitch or cement entirely covering the bolt head and threaded end of the bolt and the nut. The projections at 11 and 12 with the pipe sections form convenient pockets for the retention of such material.

Figure 2:
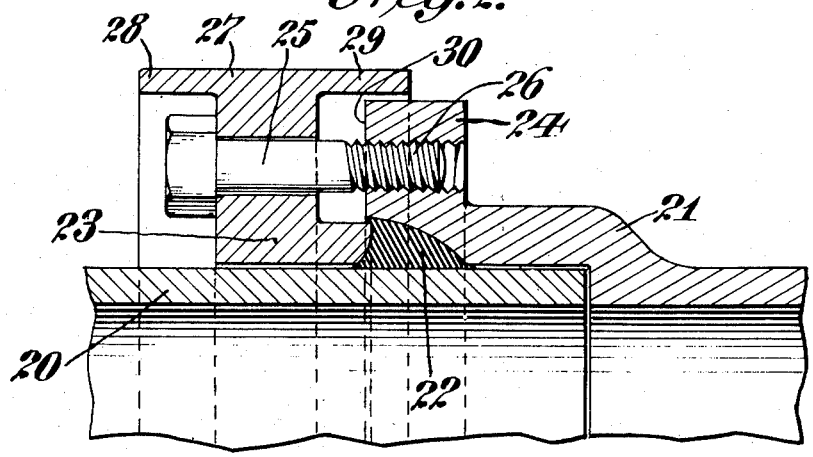
Fig. 2 shows chiefly in cross section a portion of a bolted metal bell and spigot pipe joint in which a thread bolt with no rust is employed.

Referring to Fig. 2, 20 is the spigot end of a pipe section which is inserted in the bell end 21 of an adjacent section. 22 is a rubber gasket driven into the joint by the follower ring 23, which is bolted to the flange 24 of the bell by bolts such as bolt 25, which passes through a bolt hole in the follower ring and at its threaded end 26 engages a threaded hole in the flange 24.

The extension 28 forms a protecting sleeve positioned radially beyond the exposed bolt head and the portion of the bolt between the follower ring and flange. The threaded end of the bolt is covered by the flange.

Current leaving the joint tends to leave from the extension 28 rather than the bolt, carrying metal from the extension rather than from the bolt, prolonging the useful life of the joint. The pocket formed between the extension at 28 and the spigot may be filled with plastic insulating material such as pitch or cement if desired. The extension 28 may encircle the joint or may be arranged intermittently over the bolts.

While the total current leaving the joint may be the same whether the extension 28 is provided or not, and the total weight of metal carried away may be the same, the loss is redistributed so as to be drawn to a greater extent from portions of the joint, which are not so vital and where the loss can be better afforded.

The invention has been described in connection with a bolted bell and spigot joint, it may be readily applied to other forms of bolted joints as for instance sleeve joints of the "Dresser" and other types, and is useful in joints in which the spigot is electrically insulated from the bell as well as in the joints illustrated in which there is no such insulation.

It will be obvious to those skilled in the art that modifications may be made in details of construction and arrangement and in matters of mere form without departing from the spirit of the invention which is not limited to such matters, or otherwise than the prior art and the appended claims may require.

I claim:

1. Means for opposing loss of metal by electrolytic corrosion of the bolts and nuts of pipe joints which comprise metallic extensions longer than the exposed portions of the bolts and nuts and housing and covering the bolts and nuts and providing surface exposure by which current leaves the joints instead of leaving from the surface of the bolts and nuts.

2. In a pipe joint the combination of the flanged bell section and the flanged follower ring and the bolts connecting the flanges thereof, with metallic extensions on the follower ring overlying and extending beyond the exposed portions of the bolts and presenting surface exposure from which current leaves the joint in preference to the surface of the bolts.

3. In a pipe joint, the combination of the flanged bell section and the flanged follower ring and the bolts connecting the flanges thereof, with metallic extensions on the follower ring extending beyond the ends of the bolts and overlying the exposed portions of the bolts and presenting surface exposure from which current leaves the joint in preference to the surface of the bolts.

4. Means for opposing loss of metal by electrolytic corrosion of bolts of pipe joints which comprise metallic extensions longer than the exposed portions of the bolts and housing and covering the bolts and providing surface exposure by which current leaves the joint instead of leaving from the surface of the bolts.

EDWIN L. HALL.